United States Patent [19]

Kobayashi et al.

[11] Patent Number: 5,629,110
[45] Date of Patent: May 13, 1997

[54] METHOD FOR PRODUCING CATHODE ACTIVE MATERIAL FOR NON-AQUEOUS ELECTROLYTE SECONDARY BATTERY

[75] Inventors: Shigeo Kobayashi, Yawata; Junichi Yamaura, Kobe; Kazuhiro Okamura, Kadoma; Hiromi Okuno, Osaka, all of Japan

[73] Assignee: Matsushita Electric Industrial Co., Ltd., Osaka, Japan

[21] Appl. No.: 499,670

[22] Filed: Jul. 7, 1995

[30]  Foreign Application Priority Data

Jul. 13, 1994  [JP]  Japan ..................................... 6-161189

[51] Int. Cl.⁶ .................................................. H01M 4/06
[52] U.S. Cl. .......................... 429/223; 423/594; 423/596; 429/284
[58] Field of Search ..................................... 423/594, 596; 429/218, 223, 224

[56]  References Cited

U.S. PATENT DOCUMENTS

| | | |
|---|---|---|
| 4,302,518 | 11/1981 | Goodenough et al. . |
| 4,844,999 | 7/1989 | Oshitani et al. .......................... 429/223 |
| 4,980,080 | 12/1990 | Lecerf et al. . |
| 5,370,948 | 12/1994 | Hasegawa et al. ....................... 429/223 |
| 5,427,875 | 6/1995 | Yamamoto et al. . |
| 5,432,031 | 7/1995 | Teraoka et al. ........................... 424/223 |
| 5,474,752 | 12/1995 | Yamamoto ................................ 423/596 |

*Primary Examiner*—M. Nuzzolillo
*Attorney, Agent, or Firm*—Panitch Schwarze Jacobs & Nadel, P.C.

[57]  ABSTRACT

A method for producing a cathode active material for a non-aqueous electrolyte secondary battery, which comprises the step of heating a mixture of β-Ni(OH)$_2$ and a lithium salt in the presence of oxygen at a temperature ranging from 600° C. to 800° C. to obtain LiNiO$_2$.

7 Claims, 4 Drawing Sheets

METHOD FOR PRODUCING CATHODE ACTIVE MATERIAL FOR NON-AQUEOUS ELECTROLYTE SECONDARY BATTERY

BACKGROUND OF THE INVENTION

1. Field of the Invention

The present invention relates to a method for producing a cathode active material for a non-aqueous electrolyte secondary battery, and more particularly, it relates to a method for producing a composite oxide containing nickel as a main component.

2. Description of the Prior Art

Recently, more and more audiovisual apparatus and electronic equipment such as a personal computer have been developed into portable and cordless type.

There is an increasing demand for a light and compact secondary battery having a high energy density as a power source for driving such equipment. Under such circumstances, a secondary battery using a non-aqueous electrolyte (hereinafter referred to as a non-aqueous electrolyte secondary battery), in particular, a lithium battery, is greatly expected to play a significant role as a battery providing a high voltage and a high energy density.

Examples of known cathode active materials for a non-aqueous electrolyte secondary battery include $LiCoO_2$, $LiNiO_2$, $LiMnO_2$, and the like. A battery using $LiCoO_2$ as a cathode material is already commercially available. $LiNiO_2$ has, however, not been practically used because of its small discharge capacity.

Examples of a material for synthesizing $LiNiO_2$ include $Ni(OH)_2$ and $NiCO_3$ for a nickel salt and LiOH, $LiNO_3$ and $Li_2CO_3$ for a lithium salt. As $Ni(OH)_2$, a mixture of $\alpha$-Ni$(OH)_2$ and $\beta$-Ni$(OH)_2$ or $\alpha$-Ni$(OH)_2$ alone has been used conventionally.

Carbon black has been used as an electrically conductive agent for a cathode, and a fluorocarbon polymer such as polytetrafluoroethylene and polyvinylidene fluoride as a binder.

Examples of a material for an anode include metal lithium, a lithium alloy and a carbon material which is intercalated or deintercalated with lithium.

A non-aqueous electrolyte secondary battery including conventionally prepared nickel composite oxide as a cathode active material, which is produced by heating a mixture of $\alpha$-Ni$(OH)_2$ as a nickel salt and a lithium salt, poses a problem of a small discharge capacity.

SUMMARY OF THE INVENTION

The present invention was devised to overcome the aforementioned problem. The object of the present invention is to provide a method for producing a cathode active material, i.e., nickel composite oxide, that can give a non-aqueous electrolyte secondary battery having a large discharge capacity.

The present inventors have made various studies on materials for synthesizing a nickel composite oxide by heating, and as a result, found that the use of $\beta$-Ni$(OH)_2$ as a nickel salt can attain the above-mentioned object.

The present invention provides a method for producing a cathode active material for a non-aqueous electrolyte secondary battery, which comprises the step of heating a mixture of a nickel salt containing $\beta$-Ni$(OH)_2$ as a main component and a lithium salt in the presence of oxygen at a temperature ranging from 600° C. to 800° C. to obtain $LiNiO_2$.

Furthermore, the present invention provides a method for producing a cathode active material for a non-aqueous electrolyte secondary battery, which comprises the step of heating a mixture of $\beta$-Ni$(OH)_2$, a lithium salt and one member selected from the group consisting of a cobalt salt and a manganese salt in the presence of oxygen at a temperature ranging from 600° C. to 800° C. to obtain a compound represented by the general formula $LiNi_{1-x}M_xO_2$, wherein M is Co or Mn, and $0 < x \leq 0.2$.

The lithium salt is preferably lithium hydroxide LiOH.

The cobalt salt is preferably cobalt oxide $Co_3O_4$ and the manganese salt is preferably manganese oxide $MnO_2$.

The mixture of raw materials as above can be heated not only in an oxygen atmosphere, but also in an atmosphere including oxygen such as air.

The present invention also provides a non-aqueous electrolyte secondary battery comprising an anode capable of being charged and discharged, a non-aqueous electrolyte containing a lithium compound, and a cathode having the cathode active material produced according to the above-mentioned method.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

The use of a cathode active material in accordance with the present invention can realize a non-aqueous electrolyte secondary battery having a satisfactory discharge capacity.

The present invention will now be specifically described by way of examples.

EXAMPLE 1

First, $\beta$-Ni$(OH)_2$ was synthesized as follows: To an aqueous solution of 0.1M $Ni(NO_3)_2$, a 0.1M KOH aqueous solution was added, with stirring, to make a final pH value of 11.

The obtained solution was allowed to stand for a week, and then filtered. The resultant precipitate was washed with water and dried to give $\beta$-Ni$(OH)_2$.

The structure of this $Ni(OH)_2$ can be identified by the infrared spectroscopic analysis. The infrared absorption spectra of $\beta$-Ni$(OH)_2$ peak at wavelengths of 540 $cm^{-1}$, 470

$cm^{-1}$ and 350 $cm^{-1}$, whereas the infrared absorption spectra of $\alpha$-Ni(OH)$_2$ peak at wavelengths of 645 $cm^{-1}$, 480 $cm^{-1}$ and 390 $cm^{-1}$.

The method according to the present invention for synthesizing LiNiO$_2$ by heating will now be described.

First, $\beta$-Ni(OH)$_2$ obtained as above and LiOH were mixed so as to attain a stoichiometric ratio of Li to Ni of 1:1. The thus obtained mixture was heated in an oxygen atmosphere at a temperature of 650° C. for 10 hours. The temperature was then increased up to 750° and was maintained for 20 hours.

In order to evaluate a cathode active material produced as above, a cylindrical battery was manufactured as follows:

To 100 parts by weight of LiNiO$_2$ obtained as above, 4 parts by weight of acetylene black and 7 parts by weight of a fluorocarbon resin binder were added to obtain a cathode mixture. To the cathode mixture, an aqueous solution of carboxymethylcellulose was added to obtain a paste material. The paste material was coated on both surfaces of an aluminum foil and dried, and the resultant foil was roll-pressed to produce a cathode plate.

To 100 parts by weight of a carbon material obtained by heating coke, 10 parts by weight of a fluorocarbon resin binder were added to obtain an anode mixture. To the anode mixture, an aqueous solution of carboxymethylcellulose was added to obtain a paste material. The paste material was coated on both surfaces of a copper foil and dried, and the resultant foil was roll-pressed to produce an anode plate.

Figure 1:
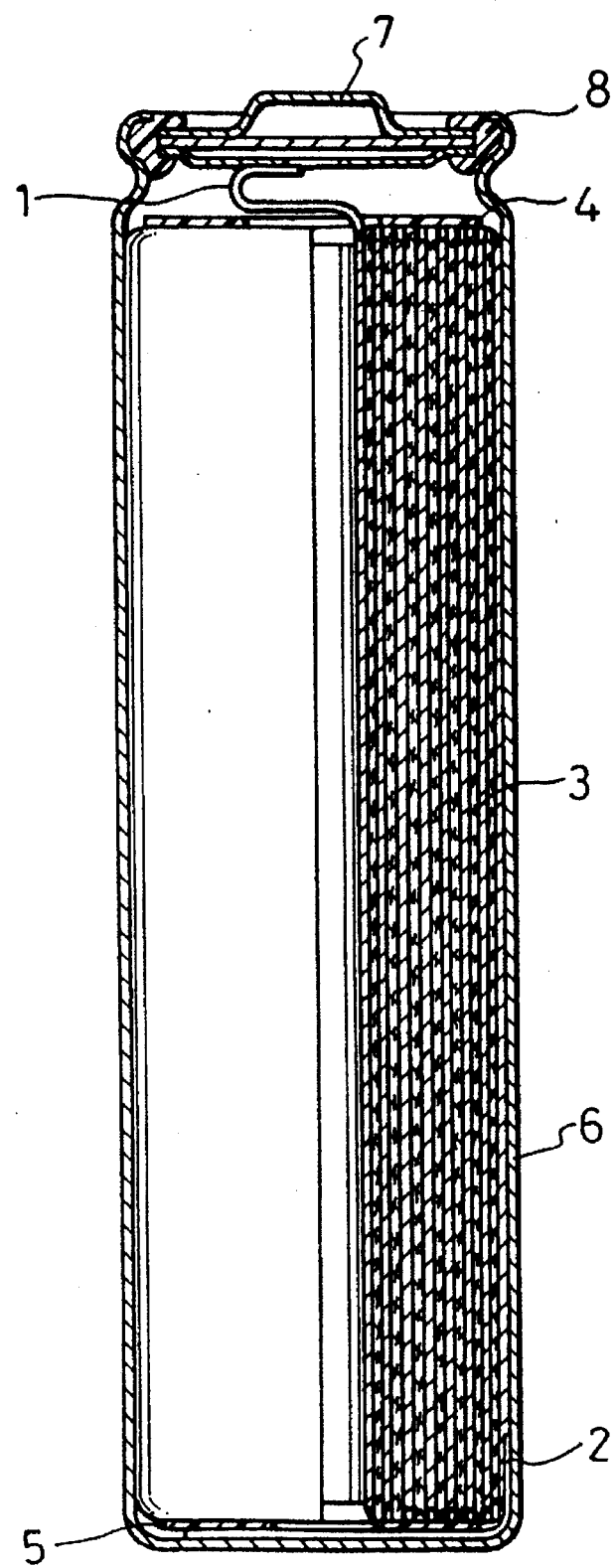
FIG. 1 is a cross-sectional side view showing a main part of a cylindrical battery of an example in accordance with the present invention.

FIG. 1 shows the schematic structure of the cylindrical battery assembled with these cathode and anode plates.

The cathode and anode plates each in the shape of a strip were provided with a cathode lead 1 and an anode lead 2, respectively, and the resultant plates were rolled up with a polypropylene separator interposed therebetween, thereby producing an electrode plate group 3. The electrode plate group 3 was provided with insulating rings 4 and 5 on the top and bottom thereof, and was housed in a battery case 6 made of stainless steel having excellent resistance against an organic electrolyte. An organic electrolyte was prepared by dissolving lithium perchlorate at a concentration of 1 mol/l in a mixture of equal volumes of propylene carbonate and ethylene carbonate. The organic electrolyte was injected into the battery case 6, and the opening of the battery case was sealed with a sealing plate assembly 7 having an insulating packing 8 on the periphery thereof.

The cathode lead 1 and the anode lead 2 are welded to the sealing plate assembly 7 and the bottom of the battery case 6, respectively.

The battery for the evaluation was subjected to five cycles of a constant current charging/discharging test under conditions of a charging current of 100 mA, a charge terminating voltage of 4.1 V and a discharge terminating voltage of 3.0 V at room temperature. Then the battery was subjected to a discharging test at a constant current of 100 mA at room temperature. The discharging characteristic obtained through the test is shown with a solid line in FIG. 2.

COMPARATIVE EXAMPLE 1

$\alpha$-Ni(OH)$_2$ as a nickel salt and LiOH were mixed so as to attain a stoichiometric ratio of Li to Ni of 1:1. The mixture was heated under the same conditions as in Example 1. The resultant LiNiO$_2$ was used as a cathode active material to manufacture a sample battery also as in Example 1. The discharging characteristic of this battery obtained in the same manner as in Example 1 is shown in FIG. 2 with a broken line.

Figure 2:
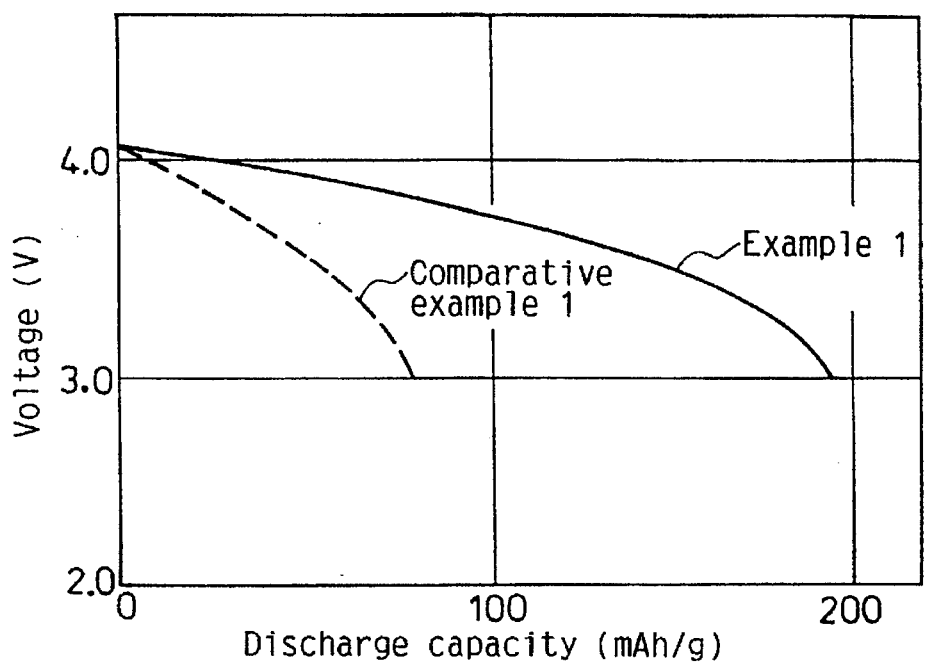
FIG. 2 is a graph showing the discharging characteristics of batteries of Example 1 in accordance with the present invention and Comparative Example 1.

As is apparent from FIG. 2, the non-aqueous electrolyte secondary battery containing, as a cathode active material, LiNiO$_2$ obtained by heating the mixture of $\beta$-Ni(OH)$_2$ as a nickel salt and a lithium salt has a larger discharge capacity than the conventional battery of Comparative Example 1 using the cathode active material prepared from $\beta$-Ni(OH)$_2$ as a nickel salt.

COMPARATIVE EXAMPLES 2 AND 3

Further study was made on lithium salts.

LiNO$_3$ and Li$_2$CO$_3$ were used as the lithium salts in Comparative Examples 2 and 3, respectively. Each of the lithium salts was mixed with $\beta$-Ni(OH)$_2$ so as to attain a stoichiometric ratio of Li to Ni of 1:1. The resultant mixture was heated under the same conditions as in Example 1.

Sample batteries were manufactured in the same manner as in Example 1 by using the obtained LiNiO$_2$ as the cathode active materials for the similar discharging tests. The results are shown in FIG. 3.

Figure 3:
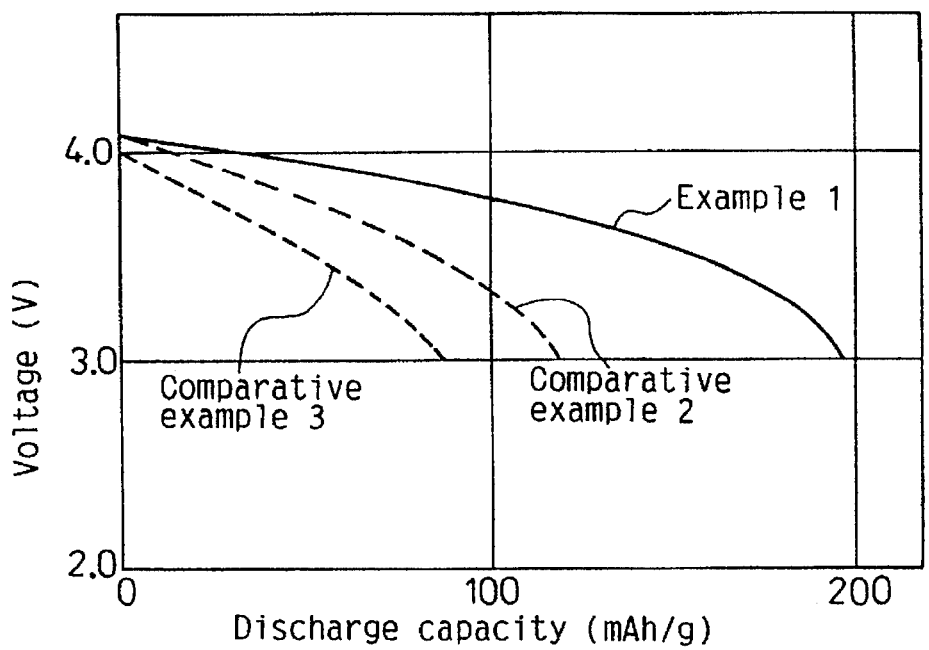
FIG. 3 is a graph showing the comparison of the discharging characteristics between active materials prepared from different lithium salts.

As is apparent from FIG. 3, in the case where LiNiO$_2$ is synthesized from $\beta$-Ni(OH)$_2$, the use of LiOH as a lithium salt results in a large discharge capacity of the resultant battery.

EXAMPLE 2

An active material obtained by substituting part of nickel in LiNiO$_2$ with manganese or cobalt was studied. Such a cathode active material was synthesized as follows:

To 65 parts by weight of $\beta$-Ni(OH)$_2$ as a nickel salt, added were 14 parts by weight of a cobalt salt, Co$_3$O$_4$, or a manganese salt, MnO$_2$, and 21 parts by weight of a lithium salt, LiOH. The mixture was heated through the two steps under the same conditions as in Example 1. The resultant cathode active materials had compositions of LiNi$_{0.8}$Co$_{0.2}$O$_2$ and LiNi$_{0.8}$Mn$_{0.2}$O$_2$.

Batteries were manufactured by using these cathode active materials and subjected to the discharging tests in the same manner as in Example 1. The results of the discharging tests are shown in FIG. 4 together with the result of the battery using LiNiO$_2$ of Example 1.

Figure 4:
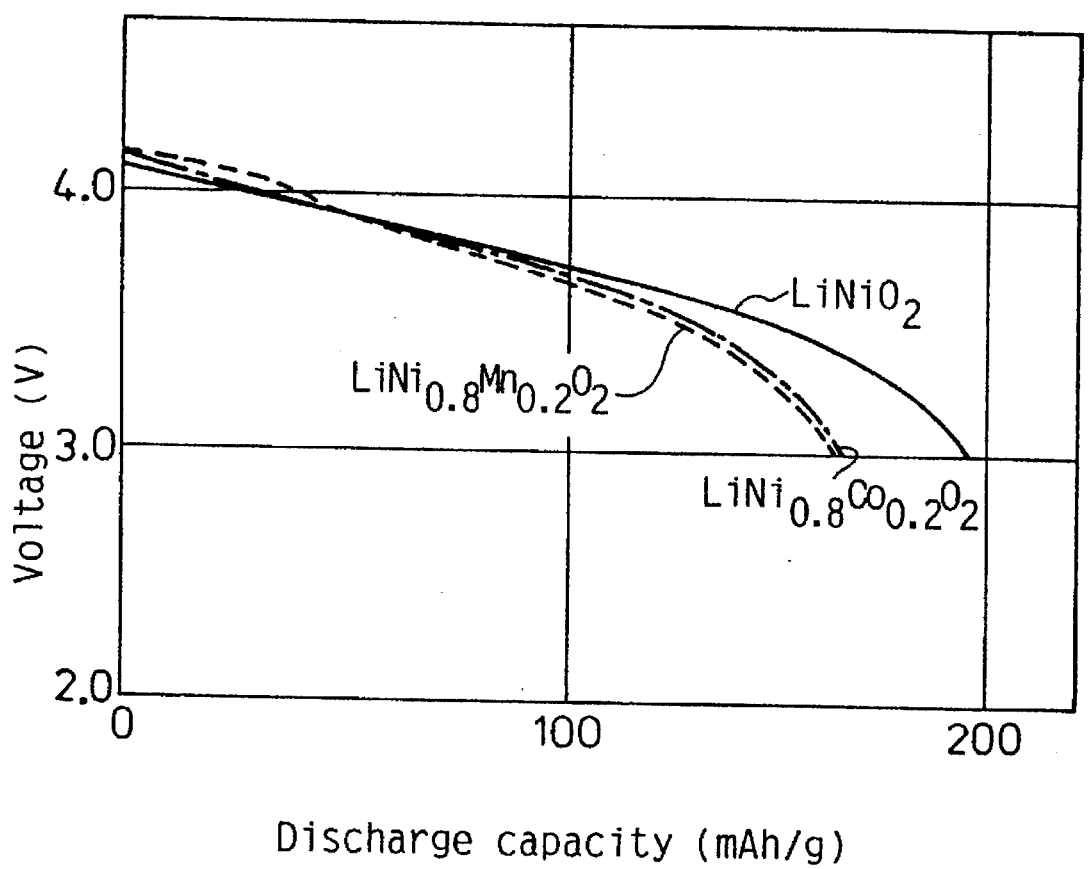
FIG. 4 is a graph showing the discharging characteristics of batteries using active materials in which part of nickel is substituted with cobalt or manganese.

As is apparent from FIG. 4, the cathode active material prepared by substituting part of nickel with cobalt or manganese, when used together with a nickel salt, $\beta$-Ni(OH)$_2$, exhibits a satisfactory discharge capacity, which is slightly inferior to that of LiNiO$_2$ of Example 1.

For comparison, $\alpha$-Ni(OH)$_2$ as a nickel salt was mixed with the lithium salt LiOH and the cobalt salt Co$_3$O$_4$ or the manganese salt MnO$_2$ in the same weight ratio as above, and the mixture was similarly hooted. A battery using the resultant active material has a smaller discharge capacity than the battery using LiNiO$_2$ prepared from $\alpha$-Ni(OH)$_2$ and LiOH.

Next, the relationship between the substituting amount of manganese or cobalt and the discharge capacity of the resultant battery was examined.

The nickel salt $\beta$-Ni(OH)$_2$ and the cobalt salt Co$_3$O$_4$ or the manganese salt MnO$_2$ were mixed with the lithium salt LiOH in various mixing ratios. The resultant mixtures were heated in an oxygen atmosphere at a temperature of 650° C. for 10 hours and further heated at a temperature of 750° C. for 20 hours. The thus synthesized active materials are represented by the formula LiNi$_{1-x}$M$_x$O$_2$, wherein M is Co or Mn, and $0 \leq x \leq 1$.

Figure 5:
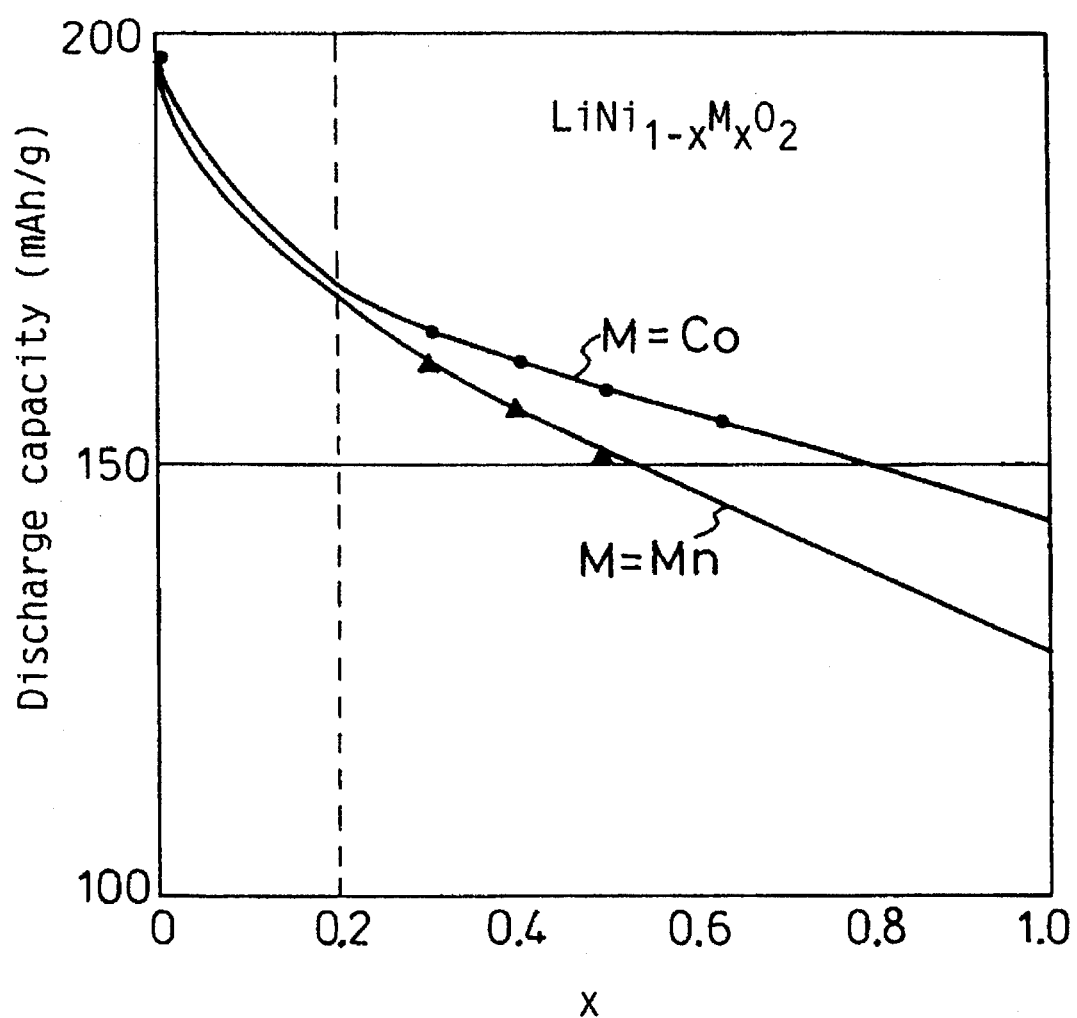
FIG. 5 is a graph showing the relationship between the substituting ratio of nickel with cobalt or manganese and the discharge capacity of the resultant battery.

Cylindrical batteries were manufactured using the respective active materials in the same manner as in Example 1, and measured for the discharge capacity at a constant current of 100 mA. FIG. 5 shows the relationship between the substituting ratio of nickel with cobalt or manganese and the discharge capacity of the resultant battery. It is demonstrated that the battery exhibits a satisfactory characteristic when the substituting ratio x is 0.2 or less.

In the foregoing examples, the raw material was heated through the two steps, one of which is performed at a temperature of 650° C. for 10 hours and the other at a temperature of 750° for 20 hours. In the first step, the desired material is synthesized, and in the second step, the crystallinity of the material is improved.

It is also possible to heat the material in a single step. Furthermore, the heating conditions can be appropriately varied within the ranges between 600° C. and 800° C., and between 2 hours and 20 hours.

When the heating temperature is below 600° C., a synthesizing reaction for $LiNiO_2$ cannot be sufficiently proceeded. When it exceeds 800° C., the synthesized $LiNiO_2$ generates oxygen to cause decomposition thereof.

It should be understood that in the present invention the material represented by the formula $LiNiO_2$ includes not only a compound with the ratio of nickel to lithium of 1:1 but also compounds with the stoichiometric ratio±approximately 5%.

The material for the anode is described as a carbon material intercalated or deintercalated with lithium in the examples, but a lithium metal or a lithium alloy attains the same effect.

Although the present invention has been described in terms of the presently preferred embodiments, it is to be understood that suck disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for producing a cathode active material for a non-aqueous electrolyte secondary battery, comprising the step of heating a mixture of $\beta$-$Ni(OH)_2$ and a lithium salt in the presence of oxygen at a temperature ranging from 600° C. to 800° C. to obtain $LiNiO_2$.

2. The method for producing a cathode active material for a non-aqueous electrolyte secondary battery in accordance with claim 1, wherein said lithium salt is LiOH.

3. A method for producing a cathode active material for a non-aqueous electrolyte secondary battery, comprising the step of heating a mixture of $\beta$-$Ni(OH)_2$, a lithium salt and one member selected from the group consisting of a cobalt salt and a manganese salt in the presence of oxygen at a temperature ranging from 600° C. to 800° C. to obtain a compound represented by the general formula $LiNi_{1-x}M_xO_2$, wherein M is Co or Mn, and $0<x\leq0.2$.

4. The method for producing a cathode active material for a non-aqueous electrolyte secondary battery in accordance with claim 3, wherein said cobalt salt is $Co_3O_4$ and said lithium salt is LiOH.

5. The method for producing a cathode active material for a non-aqueous electrolyte secondary battery in accordance with claim 3, wherein said manganese salt is $MnO_2$ and said lithium salt is LiOH.

6. A non-aqueous electrolyte secondary battery comprising an anode capable of being charged and discharged, a non-aqueous electrolyte containing a lithium compound, and a cathode having the cathode active material produced according to the method of claim 1.

7. A non-aqueous electrolyte secondary battery comprising an anode capable of being charged and discharged, a non-aqueous electrolyte containing a lithium compound, and a cathode having the cathode active material produced according to the method of claim 3.

* * * * *